(12) United States Patent
Stovall

(10) Patent No.: US 6,192,050 B1
(45) Date of Patent: *Feb. 20, 2001

(54) METHOD AND APPARATUS FOR INQUIRY RESPONSE VIA INTERNET

(75) Inventor: Gregory T. Stovall, Garland, TX (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/920,674

(22) Filed: Aug. 29, 1997

(51) Int. Cl.[7] ............... H04L 12/56; G06F 17/27; H04M 3/42
(52) U.S. Cl. ............ 370/389; 709/204; 709/227; 379/209; 379/201; 370/352
(58) Field of Search ............... 370/259, 352, 370/400, 401, 410, 522, 353, 356; 379/201, 202, 203, 205, 265, 266, 267, 369, 209; 395/859, 200.31, 200.33, 200.34, 200.38, 200.47–200.49, 200.57, 200.61, 200.62; 709/203, 227, 204, 228, 249

(56) References Cited

U.S. PATENT DOCUMENTS

| | | | |
|---|---|---|---|
| 5,311,574 | * 5/1994 | Livanos | 379/266 |
| 5,473,679 | * 12/1995 | La Porta et al. | 370/410 |
| 5,479,487 | 12/1995 | Hammond . | |
| 5,608,786 | * 3/1997 | Gordon | 370/352 |
| 5,619,557 | 4/1997 | Van Berkum . | |
| 5,657,383 | * 8/1997 | Gerber et al. | 379/266 |
| 5,699,359 | 12/1997 | Suga . | |
| 5,717,859 | 2/1998 | Yunoki . | |
| 5,724,355 | * 3/1998 | Bruno et al. | 370/410 |
| 5,737,333 | * 4/1998 | Civanlar et al. | 370/352 |
| 5,751,706 | * 5/1998 | Land et al. | 370/352 |
| 5,764,736 | * 6/1998 | Shachar et al. | 379/93.09 |
| 5,768,513 | * 6/1998 | Kuthyar et al. | 395/200.34 |
| 5,778,178 | 7/1998 | Arunachalam . | |
| 5,793,861 | * 8/1998 | Haigh | 379/266 |
| 5,794,207 | 8/1998 | Walker et al. . | |
| 5,796,393 | 8/1998 | MacNaughton et al. . | |
| 5,806,043 | 9/1998 | Toader . | |
| 5,838,682 | 11/1998 | Dekelbaum et al. . | |
| 5,867,495 | * 2/1999 | Elliot et al. | 370/352 |
| 5,884,032 | * 3/1999 | Bateman et al. | 370/356 |
| 5,991,394 | * 11/1999 | Dezonno | 379/265 |
| 5,995,606 | * 11/1999 | Civanlar | 370/352 |

OTHER PUBLICATIONS

Grove, Direct voice access to call centers from a web sites; Rockwell, pp. 1–4, Aug. 1996.*
"CTI: Computer telephony developers gain higher density", EDGE on & about AT&T, Vii, n11, p. (1), Mar. 11, 1996.
"BBN planet to become center for electronic commerce", by Joanie Wexler, Network World, p. 14, Apr. 1996.
"CMP Accession Number: CWK199603115005 and telephony", CommunicationsWeek, 1996, n600, p. 8.
"Cutting through the telebaloney", by Dave Kasiur, PC Week, v13, n25, PN3(3), Jun. 24, 1996.

* cited by examiner

*Primary Examiner*—Chi H. Pham
*Assistant Examiner*—Steven Nguyen
(74) *Attorney, Agent, or Firm*—Haynes and Boone, LLP

(57) ABSTRACT

An interactive data communication user is connected through a network to a multimedia response server. The user presses an appropriate keyboard or mouse clicks on an appropriately labeled button on a data page. An automatic call distribution device switches the session to a customer service queue for routing to the next available customer service representative. The customer service representative automatically places a internet based telephone call to the user. When the interactive session between the user and the customer service representative is completed, session control passes back to the data page server and a normal interactive session is resumed.

26 Claims, 2 Drawing Sheets

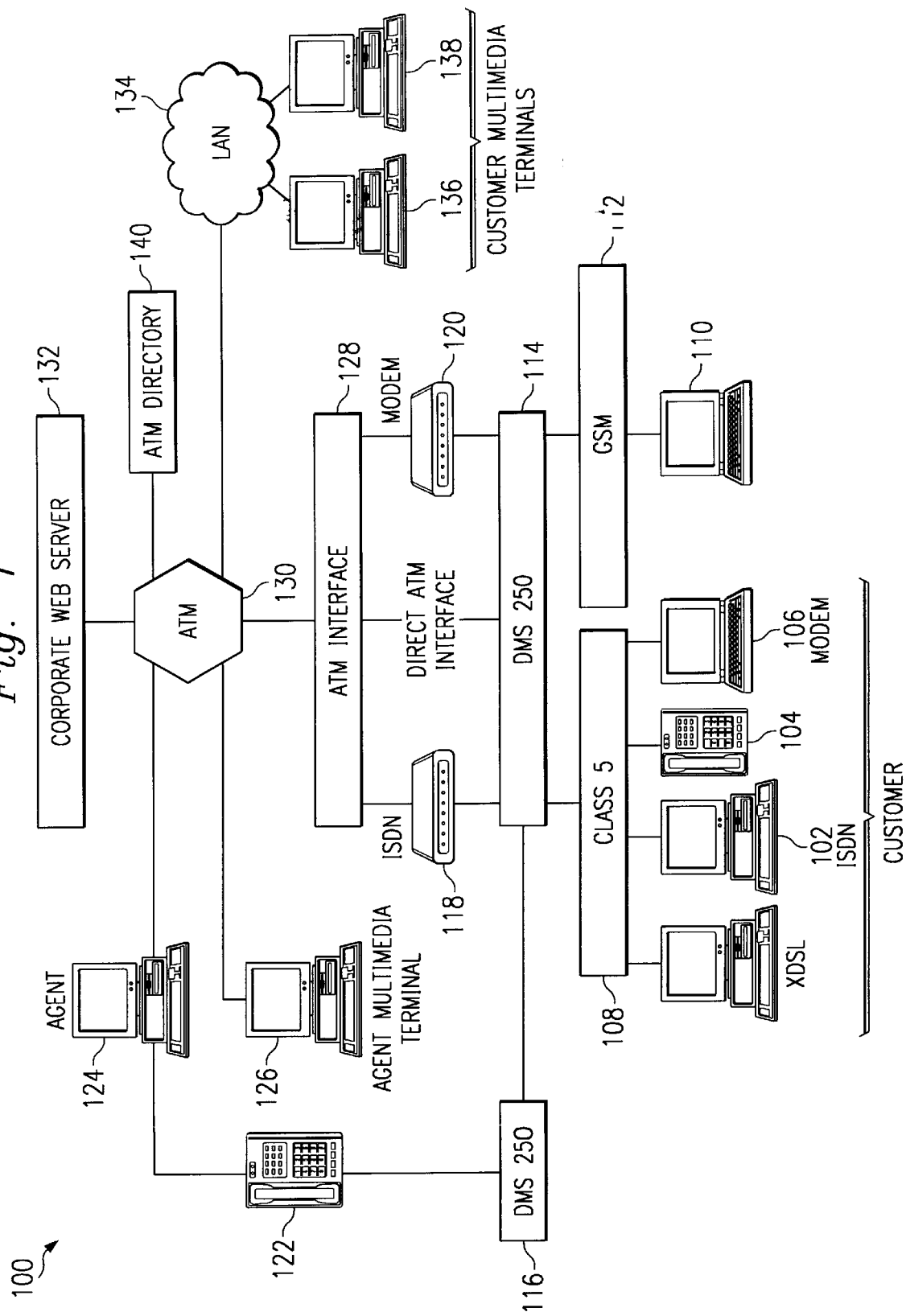

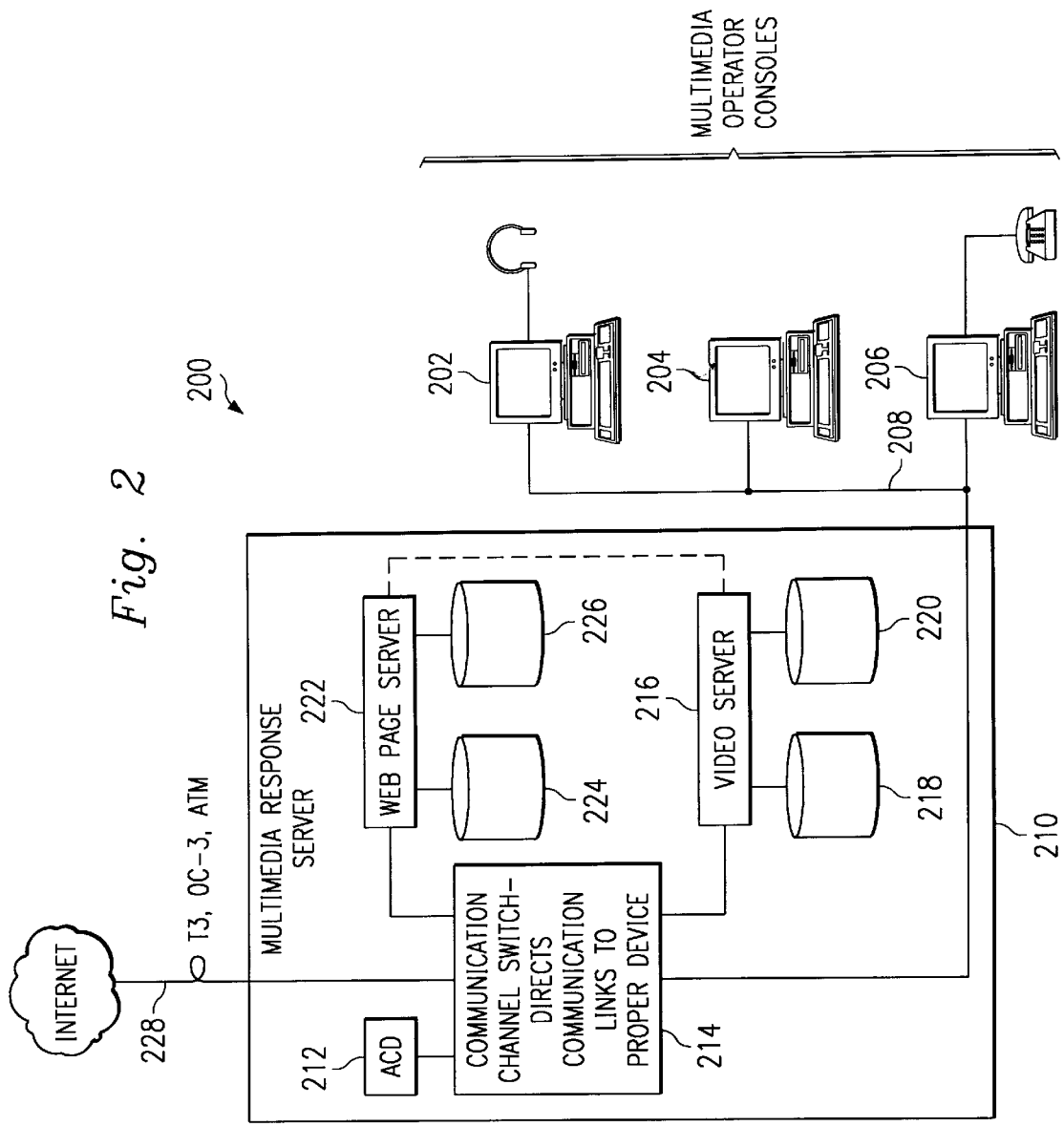
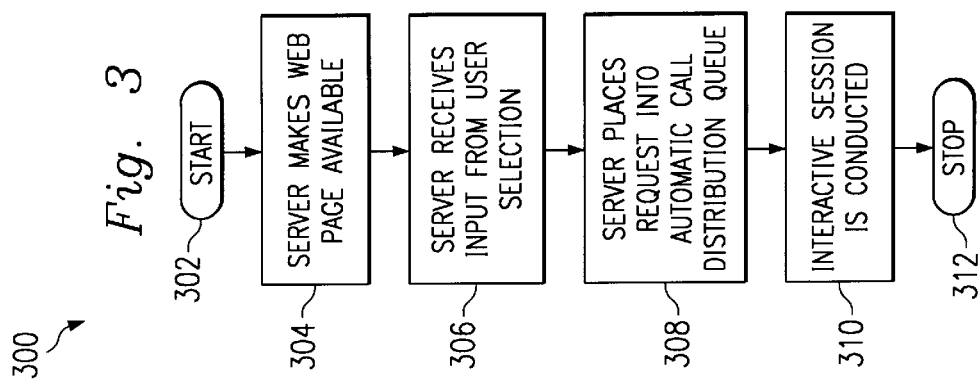

METHOD AND APPARATUS FOR INQUIRY RESPONSE VIA INTERNET

BACKGROUND OF THE INVENTION

1. Field of the Invention

The present invention relates generally to customer response networks and in particular to internet based response networks.

2. Description of the Related Art

Many companies establish and maintain home pages on the Internet's World Wide Web. These home pages may provide an electronic market place to users with a computer, appropriate software and internet access. Companies may set up layered directories that provide information in the form of electronic catalogs or brochures. Often a point of contact such as a telephone number or electronic mail address is provided as a link in the event a user requires more information or has a question for the company.

Current data services on the Web are interactive in the sense that information content is provided to a user based on keyboard or mouse input from that user. However, this response is limited to pre-programmed or "canned" text, video and/or audio.

Typically, web pages contain an e-mail address where a potential customer may send a question or ask for more information on a particular subject of interest. A response to such an inquiry may take anywhere from minutes to days. Even then, there is no assurance that the e-mailed inquiry will reach the appropriate person within the company.

In another scenario, a potential customer may obtain the company's telephone number from the web page or from directory assistance. The potential customer then places a telephone call to the company and may spend an interminable length of time on hold waiting for a customer service representative to become available. If the company number is a WATS line (usually referred to as 800 service), the company incurs a significant cost per minute for the amount of time the customer is in the call waiting queue. On the other hand, if the call is a standard toll call, the customer may incur a significant charge while waiting for his/her call to be routed to an available customer service representative.

There is accordingly a need for a new method and apparatus to provide queuing capability between a user and a company's representative in order to facilitate the transfer of information in an effective real-time manner.

As services migrate to higher bandwidth requirements and capabilities there is an increasing demand for interactive audio sessions over the internet itself.

There is accordingly an additional need for a new method and apparatus to provide an interactive live video session capability between a user and a company's representative in order to facilitate the transfer of information in an effective real-time manner.

SUMMARY OF THE INVENTION

The method and apparatus of the present invention is accomplished by having a customer or user situated at one of many user computer terminals connected to the Internet. The user accesses a company's World Wide Web Internet home page in an Internet session and decides that more information is needed and would appreciate receiving a telephone call from a live customer service representative.

The user presses an appropriate keyboard or mouse clicks on an appropriately labeled button on the Web page. An automatic call distribution device submits the user's IP address and pertinent information from the session to a customer service queue for routing to the next available customer service representative. A voice call over the Internet is then established. When the call request by the user to the customer service representative is submitted, session control passes back to the web page server and a normal interactive session is resumed. The customer then continues his previous activities while awaiting a voice call from the next available customer service representative over the internet.

One advantage of the present invention allows the user and customer service representative to conduct an interactive audio session.

Another advantage of the present invention allows the user and customer service representative to conduct an interactive audio session while not tying up scarce resources waiting for a customer service representative to become available.

Still another advantage of the present invention is the elimination of the toll charges associated with a separate telephone call over the public switched telephone network (PSTN).

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

BRIEF DESCRIPTION OF THE DRAWINGS

FIG. 1 illustrates a block diagram of the data network of the present invention.

FIG. 2 illustrates a block diagram of the multimedia response server of the present invention.

FIG. 3 illustrates a flowchart depiction of the methodology of the present invention.

DETAILED DESCRIPTION

Referring now to FIG. 1, the data network 100 of the present invention will now be discussed. A customer or user is situated at one of many user terminals 102,106,110,136, 138 which may be a personal computer, graphic enhanced mobile device such as a laptop PC, Java phone or a personal digital assistant (PDA).

The customer may be connected via an analog or digital (Integrated Services Digital Network (ISDN) or XDSL)

connection to a Class 5 (local telephone switching) office 108, which in turn is connected to a tandem switch 114. Tandem switch 114 is capable of making both local and toll (long distance) telephone connections and is connected through modem 120, direct connection or ISDN 118 connection to Asynchronous Transfer Mode (ATM) interface 128.

ATM interface 128 is connected to ATM backbone 130. ATM backbone 130 supplies the interconnections and transport mechanisms of the data communications network, or Internet of the preferred embodiment. These transport mechanisms are well known and thus need not be further explained here.

Customers are also connected through terminals 136,138 to the Internet embodied by ATM backbone 130 through Local Area Network (LAN) 134. LAN direct connectivity is an alternative to dial-up connections.

A live person acting as a Company's agent or customer service representative is stationed at agent terminal 124. Terminal 124 contains an autodialer which automatically dials a preprogrammed or an entered telephone number from telephone 122. This telephone number is the telephone number of the customer who has entered his/her own telephone number sometime during a Web page access session.

The telephone call placed by the Customer service agent located at terminal 124 through telephone 122 is switched through tandem switch 116 to class 5 central office 108 to the customer.

In an alternative embodiment, a customer may be connected through a mobile terminal via a wireless data link provided by a cellular, PCS or other wireless service provider.

Corporate Web Server 132 is connected to ATM backbone 130 through a direct connection.

In an alternate embodiment, the corporate Web Server, stationary or mobile, may also be connected via a similar wireless data link interfaced to the Internet.

Referring now to FIG. 2, Corporate Web Server 200 will now be discussed in further detail. Multimedia response server 210 is connected to the Internet 230 via ATM link 228. ATM link 228 is typically either across a T-3 carrier operating at approximately 44 MHz or is an OC-48 (or higher) Synchronous Optical Network (SONET) connection. The details of such connections are well known and need not be discussed further.

The T-3 interconnection 228 interconnects with Multimedia Response Server 210 at the communication channel switch 214. Communication channel switch 214 is controlled by Web page server 222. Also connected to communication channel switch 214 are the Automatic Call Distribution (ACD) unit 212, video server 216 and multiple multimedia operator consoles 202,204,206.

Communication channel switch 214 is a Northern Telecom Magellan, Vector or other suitable switch.

Web page server 222 operates to supply content to customers who access the Web page, controls connections to and from communication channel switch 214.

Video server 216 supplies high bandwidth video to customers accessing the Web page through communication channel switch 214.

Automatic Call Distribution (ACD) 212 unit operates by transferring customer information such as telephone number or Internet Protocol (IP) address and subject of the further information requested into a queue for service by the next available operator stationed at one of the multimedia operator consoles 202,204,206. A customer who is accessing the Web page on the Web server typically mouse clicks on a hot button or link found on the Web page. This link is identified as a channel for selecting a live interactive call-back session with a human operator. Upon availability of the human operator at one of the multiple multimedia operator consoles 202,204,206 the interactive call-back session is initiated over the internet to the IP address previously placed in the queue. Upon the successful connection of the call between the customer service representative and the customer, an interactive audio session over the network is conducted. Upon termination of the interactive audio session, the connection is taken down and the next queued interactive audio session is initiated.

Multimedia operator consoles 202,204,206 and customer terminals 102,106,110,136,136 are equipped with appropriate multimedia equipment and software. Typical equipment includes commercial off the shelf microphones/headsets with speakers, digital signal processor based peripheral sound cards, and a video camera with its video interface to the terminals and consoles.

When the customer initiates the interactive multimedia session the content of the customer's screen is accessible by the agent on the multimedia operator console. The session participants in one embodiment are also able to view each other through the video camera output portion of the link and are able to converse audibly to conduct business.

The customer agent is able to see exactly what the customer is trying to describe and is therefore capable of answering questions and solving problems in a much more time efficient manner without tying up more resources.

The customer agent is able to diagnose conditions and problems on a customer's computer in real-time or near real-time and can download software to determine configurations, correct errors, modify settings and add or delete software modules as desired. Of course, the multimedia response server automates many of these functions and does not require a human customer agent in many of these situations.

Referring now to FIG. 3, the methodology 300 of the present invention will now be discussed. The process begins in step 302 with the program Start function. In step 304, the Web server makes the Web page available to customers over the Internet or any other suitable public or private data network.

A Customer accesses the Web page from his/her computer terminal using the appropriate physical connection and software.

As an example, if the Web page is for a travel agent, the customer could search for airline flights to a desired destination at a particular time and for a particular price. If the specific parameters defined do not result in a satisfactory result for the customer, or if at any time during a session live human interaction is desired or required, then the customer clicks on the graphical hot button or link (step 306) and optionally is prompted to enter his name, phone number and a description of the subject in question, if this information is not already available. The IP address is transferred in step 308 by an automatic distribution mechanism into a call-back queue via the above described invention and a live call-back session in step 310 is conducted in an effort to satisfy the customer's request. Upon completion of the session, control passes to step 312, Stop.

Other such embodiments of the invention will be apparent to those skilled in the art from consideration of the specification and practice of the invention disclosed herein. It is readily apparent that the above described invention may be implemented in other types of data networks, public and private, including an intranet or an internet, whereby these terms denote an either an internal network of computers or any internetworking of communication devices. It is intended that the specification and examples be considered as exemplary only, with a true scope and spirit of the invention being indicated by the following claims.

What is claimed is:

1. An apparatus for conducting a multimedia communication over a data communications network, comprising:

means for receiving an incoming query from an external user relating to information displayed on a client computer connected to said data communications network through a network connection;

means for receiving a network address relating to the client computer;

means for identifying said incoming query as a call-back request; and means for providing the network address to an operations console;

means for communicating over said data communications network between said external user and an operator, both having access to said information displayed on the operations console connected to said data communications network, wherein the means for communication utilizes the same network connection that connects the client computer to the data communication network; and wherein said communicating occurs while both said external user and said operator are accessing said information.

2. An apparatus for conducting a multimedia communication over a data communications network as in claim 1 wherein said data communications network comprises a switching mechanism operably connected to a first server control mechanism for passing data to said operations console for communication processing.

3. An apparatus for conducting a multimedia communication over a data communications network as in claim 2 wherein said data communication network includes a queueing and an interactive capability.

4. An apparatus for conducting a multimedia communication over a data communications network as in claim 3 wherein said data communication network includes a real time capability.

5. An apparatus for conducting a multimedia communication over a data communications network as in claim 3 wherein said data communication network includes at least a near real time capability.

6. An apparatus for conducting a multimedia communication over a data communications network as in claim 5 further comprises means for automatically distributing said incoming query and said network address from a queue to the operations console at a particular destination.

7. An apparatus for conducting a multimedia communication over a data communication network as in claim 6 wherein said particular destination is connected to a second data communications network coupled to said network.

8. An apparatus for conducting a multimedia communication over a data communication network as in claim 6 wherein said particular destination is an interactive station for conducting a customer service transaction.

9. An apparatus for conducting a multimedia communication over a data communication network as in claim 8 further including a second server control mechanism for passing data to said switching mechanism for routing to an external destination.

10. An apparatus according to claim 2 wherein said client computer is coupled to said switching mechanism through the Internet.

11. An apparatus according to claim 10 wherein said client computer comprises means for said external user to transmit said call-back request.

12. An apparatus according to claim 11 wherein said call-back request is received by said switching mechanism which stores said call-back request in a queue, said call-back request being provided from said queue to said operations console on a first in first out basis.

13. An apparatus according to claim 12 wherein said operator responds to said call-back request by initiating said multimedia communication over the Internet using a first audio device attached to said operations console to communicate with said external user through a second audio device attached to said client computer.

14. A method for conducting a multimedia communication over a data communications network comprising the steps of:

receiving an incoming query from an external user relating to information displayed on a client computer connected to said data communications network through a network connection;

receiving a network address relating to the client computer;

identifying said incoming query as a call-back request; and providing a multimedia communication to said client computer through the network connection using the network address, the multimedia communication being between said external user and an operator having access to said information displayed on an operations console connected to said data communications network;

wherein said multimedia communication occurs while said external user and said operator are both accessing said information.

15. A method for conducting a multimedia communication over a data communications network as in claim 14 further comprising the step of operably connecting a first switching mechanism to a server control mechanism passing data to an operations console for communication processing.

16. A method for conducting a multimedia communication over a data communications network as in claim 15 further comprising the step of having a queuing and an interactive capability.

17. A method for conducting a multimedia communication over a data communications network as in claim 16 further comprising the step of storing the network address in a queue.

18. A method for conducting a multimedia communication over a data communications network as in claim 17 further comprising the step of interacting in an at least near real time mode.

19. A method for conducting a multimedia communication over a data communications network as in claim 14 further comprising the step of automatically distributing said incoming query and said network address from a queue to the operator, based on a predetermined criteria.

20. A method for conducting a multimedia communication over a data communication network as in claim 19 wherein the operator is connected to a second data communications network coupled to said network.

21. A method for conducting a multimedia communication over a data communication network as in claim 19 wherein said particular destination is an interactive station for conducting a customer service transaction.

22. A method for conducting a multimedia communication over a data communication network as in claim 21 further comprising the step of providing data by a second server control mechanism, to said switching mechanism for routing to an external destination.

23. A method according to claim 15 further comprising the step of coupling a client computer system to said switching mechanism through the Internet.

24. A method according to claim 23 further comprising the step of transmitting by said external user said call-back request from said client computer to said switching mechanism.

25. A method according to claim 24 further comprising the steps of:
   receiving said call-back request by said switching mechanism;
   storing said call-back request in a queue; and
   providing said call-back request from said queue to said operations console on a first in first out basis.

26. A method according to claim 25 further comprising the step of responding by said operator to said call-back request by initiating said multimedia communication over the Internet using a first audio device connected to said operations console to communicate with said external user through a second audio device connected to said client computer.

* * * * *